US007703996B1

(12) United States Patent
Sexton, Jr. et al.

(10) Patent No.: US 7,703,996 B1
(45) Date of Patent: Apr. 27, 2010

(54) SURVEILLANCE UNIT AND METHOD OF USE THEREOF

(75) Inventors: Frederick D. Sexton, Jr., Lakeland, TN (US); John F. Osteen, Germantown, TN (US); Kenneth Alan Shackleford, Cordova, TN (US); Lester W. Mikles, Bartlett, TN (US); Warner E. Speakman, Oakland, TN (US)

(73) Assignee: STI, Inc., Memphis, TN (US)

( * ) Notice: Subject to any disclaimer, the term of this patent is extended or adjusted under 35 U.S.C. 154(b) by 899 days.

(21) Appl. No.: 11/497,059

(22) Filed: Aug. 1, 2006

Related U.S. Application Data

(60) Provisional application No. 60/781,795, filed on Mar. 13, 2006.

(51) Int. Cl.
*G03B 17/00* (2006.01)
*H04N 7/18* (2006.01)
*E04G 3/00* (2006.01)
*E04G 5/06* (2006.01)
*F21V 21/00* (2006.01)
*F21V 35/00* (2006.01)

(52) U.S. Cl. .................. 396/427; 348/143; 248/218.4
(58) Field of Classification Search ............... 396/427; 348/143, 224.7, 220.21, 220.22, 220.31, 348/220.41; 361/724, 725, 727; 248/218.4, 248/219.1–219.4
See application file for complete search history.

(56) References Cited

U.S. PATENT DOCUMENTS

| | | | |
|---|---|---|---|
| 4,097,893 A | 6/1978 | Camras | |
| 4,103,853 A * | 8/1978 | Bannan | ................... 248/219.1 |
| 4,796,039 A * | 1/1989 | Pagano | ...................... 396/427 |
| 5,065,249 A | 11/1991 | Horn et al. | |
| 5,583,571 A | 12/1996 | Friedland | |
| 5,712,679 A * | 1/1998 | Coles | ......................... 348/158 |
| 5,793,419 A | 8/1998 | Fraley | |
| 6,091,453 A | 7/2000 | Coan et al. | |
| 6,246,320 B1 | 6/2001 | Monroe | |
| 6,378,821 B1 * | 4/2002 | McKelvy et al. | ......... 248/218.4 |
| 6,486,399 B1 * | 11/2002 | Armstrong et al. | ............ 174/58 |
| 6,530,702 B2 | 3/2003 | Harris | |
| 6,581,546 B1 | 6/2003 | Dalland | |
| 6,587,046 B2 | 7/2003 | Joao | |
| 6,614,468 B1 * | 9/2003 | Nordmann | .................. 348/143 |
| 6,636,256 B1 | 10/2003 | Passman et al. | |
| 6,700,492 B2 | 3/2004 | Touchton | |

(Continued)

OTHER PUBLICATIONS

Archived Wikipedia entry "GSM." http://web.archive.org/web/20050730084433/http://en.wikipedia.org/wiki/GSM , archived Jul. 30, 2005, accessed Jun. 16, 2009.*

(Continued)

*Primary Examiner*—W. B. Perkey
*Assistant Examiner*—Noam Reisner
(74) *Attorney, Agent, or Firm*—Wyatt, Tarrant & Combs, LLP

(57) ABSTRACT

A surveillance system and method of use thereof is disclosed. The surveillance system provides a continuous presence and may be operated by remote control. The system may automatically record video and audio when certain audio, such as a gun shot, is detected. The system may automatically contact the authorities, or other remotely located devices upon the occurrence of an undesirable event.

16 Claims, 10 Drawing Sheets

U.S. PATENT DOCUMENTS

| | | | |
|---|---|---|---|
| 6,842,349 B2 * | 1/2005 | Wrycraft et al. | 361/796 |
| 6,961,079 B2 * | 11/2005 | Kaylor et al. | 348/49 |
| 6,970,183 B1 | 11/2005 | Monroe | |
| 7,009,698 B2 | 3/2006 | Drost et al. | |
| 7,181,228 B2 | 2/2007 | Boesch | |
| 7,184,907 B2 | 2/2007 | Chun | |
| 7,193,508 B2 | 3/2007 | Hill et al. | |
| 7,271,704 B2 | 9/2007 | McSheffrey et al. | |
| 7,277,018 B2 | 10/2007 | Reyes et al. | |
| 7,323,980 B2 | 1/2008 | Faulkner et al. | |
| 7,331,882 B1 * | 2/2008 | White | 473/481 |
| 7,336,169 B2 | 2/2008 | Coonce et al. | |
| 7,365,641 B2 | 4/2008 | Nou | |
| 7,394,916 B2 | 7/2008 | Brodsky et al. | |
| 7,397,368 B2 | 7/2008 | Otto et al. | |
| 2004/0000079 A1 * | 1/2004 | Emert | 40/544 |
| 2005/0029419 A1 * | 2/2005 | Ware et al. | 248/218.4 |
| 2005/0151846 A1 * | 7/2005 | Thornhill | 348/149 |
| 2005/0179799 A1 | 8/2005 | Umanskiy et al. | |
| 2005/0270373 A1 | 12/2005 | Trela | |
| 2006/0071130 A1 | 4/2006 | Kopitar et al. | |
| 2007/0052804 A1 | 3/2007 | Money et al. | |
| 2007/0285270 A1 | 12/2007 | Gunn et al. | |
| 2008/0130949 A1 | 6/2008 | Inanov et al. | |

OTHER PUBLICATIONS

Archived Wikipedia article "H.264" http://web.archive.org/web/20050728151811/http://en.wikipedia.org/wiki/H.264, archived Jul. 28, 2005, accessed Jun. 17, 2009.*

Gary Washburn; "City Sold on Video Security"; Chicago Tribune, dated Feb. 18, 2006, 3 pages, printout from http://www.podss.net/PDF/PODSS_Trib_060218.pdf, on Sep. 11, 2007.

Davis Heinzmann; "Smile, You're on Candid Cop Cam", Chicago Tribune, dated Feb. 25, 2005, 2 pages, printout from http://www.podss.net/PDF/PODSS_Trib_050225.pdf, on Sep. 11, 2007.

Matt O'Connor; "34 Seized in Drug Busts; Wiretaps Build Case", Chicago Tribune, dated May 26, 2005, 2 pages, printout from http://www.podss.net/PDF/PODSS_Trib_050526.pdf, on Sep. 11, 2007.

"Wave Wireless Helps Chicago Police Reduce Crime", Sys-Con Media, dated Apr. 12, 2006, 2 pages, printout from http://www.podss.net/PDF/PODSS_SysCon_060412.pdf, on Sep. 11, 2007.

"Crime Reduction Strategy Uses High Visability Surveillance Cameras", Operation Disruption, 2 pages, printout from http://www.podss.net/PDF/PODSS_OpDisrupt.pdf.

"RMS Business Systems, Police Department, Video Surveillance PODSS Project, Articles on the WEB"; dated Apr. 16, 2004, 36 pages, printout from http://www.podss.net/PDF/PODSS_Success_040416.pdf, on Sep. 11, 2007.

* cited by examiner

SURVEILLANCE UNIT AND METHOD OF USE THEREOF

This application claims the benefit of U.S. Provisional Patent Application No. 60/781,795, filed Mar. 13, 2006, entitled "Surveillance Unit and Method of Use Thereof," which is hereby incorporated by reference in its entirety.

Be it known that we, Fredrick D. Sexton Jr., a citizen of the United States, residing at 9374 Canabridge Dr., Lakeland, Tenn. 38002, John F. Osteen, a citizen of the United States, residing at 8019 Breezy Creek Rd., Germantown, Tenn. 38138, Kenneth Alan Shackleford, a citizen of the United States, residing at 8664 Old River Rd., Cordova, Tenn. 38018, Lester W. Mikles, a citizen of the United States, residing at 6560 Deermont Dr., Bartlett, Tenn. 38134, and Warner E. Speakman, a citizen of the United States, residing at 4280 Warren Rd., Oakland, Tenn. 38060, have invented a new and useful "Surveillance Unit and Method of Use Thereof"

STATEMENT REGARDING FEDERALLY SPONSORED RESEARCH OR DEVELOPMENT

Not applicable

REFERENCE TO A MICROFICHE APPENDIX

Not applicable

FIELD OF THE INVENTION

The present invention relates to the area of surveillance technology.

BACKGROUND OF THE INVENTION

Many cities have high crime areas which require a police presence in order to keep the peace. Placing law enforcement officers in such high risk environments is not desirable. Further, it is costly and difficult to place such personnel in such environments at all times. Accordingly, what is needed is an automated surveillance unit which automatically monitors an environment, transmits video and audio signals from the environment, and allows remote control intervention of the surveillance unit in order to capture possible evidence from the environment should an undesirable event, such as a crime, occur.

SUMMARY OF INVENTION

Disclosed herein is a surveillance unit having the benefits of existing surveillance technology with the added benefits of (i) compression video storage, such that at least weeks of video/audio recordings may be stored by the unit, (ii) an easy to use bracket mounting system for attachment of the surveillance unit to a pole or building, (iii) a back lighted exterior for enhanced visibility, and (iv) communication of a triggering event, such as gun shots, to the authorities, or others, via a MESH, LAN, WAN, or GSM network. As further described herein, the present invention provides instant communication and recordation of evidence for people located within several thousand feet of the surveillance unit. Further, the invention provides a security presence so that the likelihood of crime is reduced. The surveillance unit disclosed is used to communicate with security personnel in the immediate area, or security personnel located at other locations, such as a 911 center, video central station, or in a vehicle. The surveillance unit of the present invention may constantly record and store audio/video data, or may initiate recordation upon the occurrence of an event. Live video and/or audio may be reviewed by remote control with directional control of the camera being controlled remotely. The recorded data is day and time stamped in the event that review of it at some point in the future is desired. Such long term storage, for example a minimum of several weeks, of recorded data is beneficial, for example, in the investigation of a missing person. Often, such victims are missing for a while before being reported to the authorities.

Disclosed herein is a surveillance system, including, a housing, a frame removeably engaging the housing, a plurality of panels removeably engaging the frame, a recording device attached to one of the plurality of panels, wherein the recording device has H264 compression technology, also known as H.264.10, a camera operationally connected to the recording device, wherein the camera has a microphone and speaker, a GSM network operationally connected to the recording device, a uninterrupted power source operationally connected to the recording device, and a mounting bracket attached to the housing. In certain embodiments of the invention, the mounting bracket further includes a first mount, a second mount removeably engaging the first mount, wherein the second mount is removeably attached to a pole. In certain embodiments, the system further includes a second unit communicationally connected with the surveillance unit. In still other embodiments, the system further includes a gunshot detection unit operationally connected to the camera so that the camera rotates and focuses in the direction from which a gunshot is detected. In certain embodiments, the recording device is a digital video recorder. In other embodiments, the housing is bulletproof. In still other embodiments, the housing is backlit.

Disclosed herein is an embodiment of a surveillance system, including a housing, a frame removeably engaging the housing, a plurality of panels removeably engaging the frame, a first mount attached to the housing, a second mount removeably engaging the first mount, wherein the second mount is removeably attached to a pole. In certain embodiments, the first mount is a channel for receiving the second mount, the channel having a first end, a second end, and opposite sides, the opposite sides defining a plurality of openings, the first end having a top, and the second mount is an arm, having opposite sides defining a plurality of openings, the openings corresponding to the openings of the first mount, the opposite sides of the second mount define a plurality of second openings adjacent to a side opposite of the side proximate to the housing so that the plurality of second openings receive fasteners for attaching the second mount to a pole. In other embodiments, the plurality of second openings of the second mount is at least 5 openings. In certain embodiments, the second mount has a length of at least 12 inches. In still other embodiments, the system includes a plurality of spacers attached to the housing so that a ventilation gap results when the frame sits upon the plurality of spacers.

Also disclosed herein is a surveillance system, including, a frame, wherein the frame is generally rectangular in shape, at least one panel removeably engaging the frame, an uninterrupted power source attached to the panel, a cooling system operationally connected to the uninterrupted power source, a digital video recorder operationally connected to the uninterrupted power source, a video camera operationally connected to the digital video recorder, a microphone and speaker operationally connected to the digital video recorder, a GSM network operationally connected to the digital video recorder, a gunshot detection system operationally connected to the digital video recorder, a second unit operationally connected to the GSM network so that the camera and digital video recorder are controlled remotely by the second unit, a housing attached to the frame, wherein the housing is bullet proof, wherein at least a portion of the housing is backlit, a first mount attached to the housing, wherein the first mount is a channel for receiving the second mount, the channel having a first end, a second end, and opposite sides, the opposite sides defining a plurality of openings, the first end being enclosed, and a second mount removeably engaging the first mount, wherein the second mount is an arm having opposite sides defining a plurality of openings, the openings corresponding to the openings of the first mount, wherein the opposite sides of the second mount define a plurality of second openings adjacent to a side opposite of the side proximate to the housing so that the plurality of second openings receive fasteners for attaching the second mount to a pole. In certain embodiments, the second unit may be a personal data assistant, a laptop computer, or a mobile command center.

It is an object of the invention to provide a surveillance system which transmits an alarm to the authorities, or others, upon the occurrence of an undesirable event.

It is another object of the invention to provide a surveillance system which readily transmits video and audio recordings from the surveillance unit to a second unit for review and analysis.

It is still another object of the invention to provide a surveillance system which quickly and efficiently transmits and archives audio and video recordings for future review.

It is another object of the invention to provide a mounting device for the quick and sturdy mounting of a surveillance device to a pole.

PREFERRED EMBODIMENTS OF THE INVENTION

Figure 1:
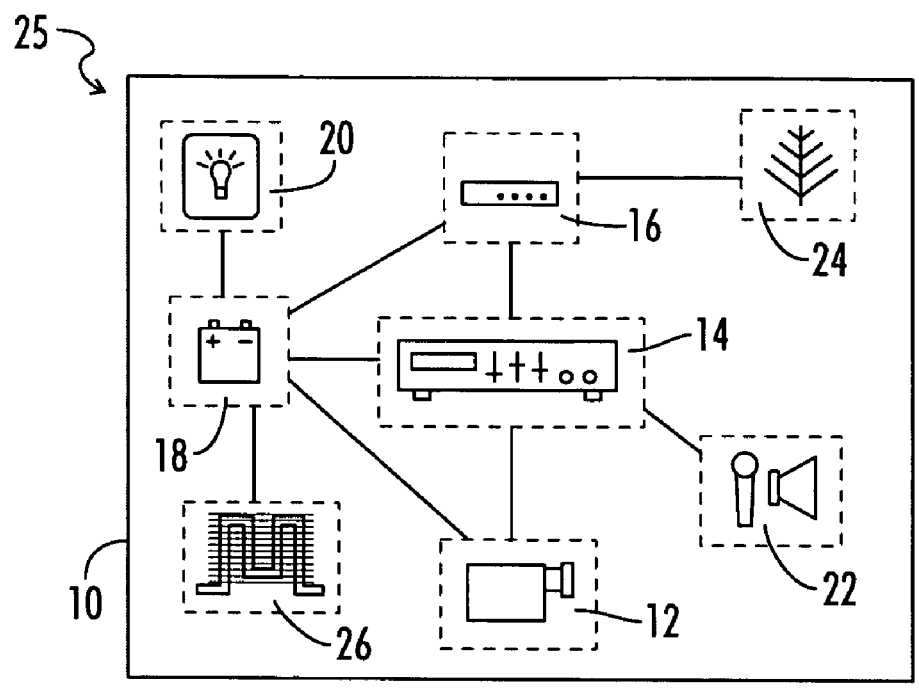
FIG. 1 shows a first embodiment of the surveillance unit, having a camera, DVR, router, and UPS.

The present invention is a remote video and audio monitoring and recording system. At least one application of the invention is to provide video and audio surveillance in areas which have high potential for criminal activity. The present convention is available as in overt surveillance system or a covert surveillance system. In the overt embodiment, the invention is clearly identified as a surveillance system with the objection of crime prevention in high crime areas, tourist areas, government buildings, municipalities, high risk homeland security targets, and the like. The covert embodiment is designed for undercover surveillance which would not readily be recognized as a surveillance system. All of the embodiments are typically installed on poles or buildings and can monitor and record activities with camera coverage capabilities of 360 degrees at distances up to several thousand feet. The invention has the capability of locally recording onto a DVR 14 video and audio, which can be downloaded by a wireless or hardwired communication. The invention may also include H264 compression, also called H.264.10, for live viewing and recording which can be transmitted to remote locations such as 911 centers 39 or police stations using wireless networks including cellular technology and low bandwidth satellite technology.

The present invention discloses a surveillance unit 25. The surveillance unit 25 includes a housing 10, a camera 12, a recording device 14, which may be a digital video recording (DVR) unit 14, a broadband router 16, an uninterrupted power source (UPS) 18, a microphone/speaker 22, and an antenna 24. In certain embodiments of the surveillance unit 25 includes a cooling system 26, a global system for mobile communication (GSM) network 28. In still other embodiments, the surveillance unit 25 further includes a gunshot detection unit 30.

Also disclosed herein is a surveillance system 11 which includes the surveillance unit 25 and a second unit 27 operationally communicating with the surveillance unit 25. In certain embodiments the second unit 27 may be a personal data assistant (PDA) 36. In alternate embodiments, the second unit 27 may be a laptop computer 38 within a police car. In still other embodiments the second unit 27 may be a mobile command center 34, or a 911 center 39.

Further disclosed herein is a method of conducting surveillance of an area which includes recording video to the DVR 14, communicating with a second unit 27, and downloading contents of the DVR 14 to the second unit 27.

Referring now to FIG. 1, there is a shown a schematic diagram of a first embodiment of the surveillance unit 25. The first embodiment of the surveillance unit 25 includes a digital video recorder 14, attached to a camera 12, a UPS system 18, a broadband router 16, and a microphone/speaker 22. As best seen in other Figures further described below, a plurality of panels 15, specifically, a first panel 102 and second panel 104 in certain embodiments, are used as points of attachment for the electronics which comprise the surveillance unit 25. The panels 15 may be constructed of any rigid material suitable for the stated function, for example steel, or aluminum. Attachment of those electronics to the plurality of panels 15 is accomplished in the ordinary manner as known in the art. Further, the connections between the components of the present invention are those operational connections known to those of ordinary skill in the art. The schematic diagrams of FIGS. 1-4 use lines to demonstrate the operational connectivity of the parts shown (i.e. wires, or other means, attaching, or allowing communication, or connectivity so that, for example, the camera 12 and the DVR 14 capture and record video/audio, or data is transferred via wireless technology, or the like). Operational connectivity includes any connections necessary for power, data or information transfer, or the like, for the operation of the specific device. One of ordinary skill in the art is familiar with such types of connections. Referring back to the lines used in FIGS. 1-4, the following listed examples illustrate the information provided therein. For example, as seen in FIG. 1, the DVR 14 is operationally connected to the camera 12, microphone/speaker 22, router 16, and UPS 18. As a second example, the camera 12 is operationally connected to the UPS 18, and the DVR 14. In certain embodiments, the camera 12 may include a microphone for capturing audio. The several embodiments disclosed in FIGS. 1-3 may also include the various power sources and power supplies further described herein, or known to those of ordinary skill in the art. The UPS system 18 is additionally attached to and provides a power source for the backlit artwork 20, broadband router 16, camera 12, and cooling system 26. The broadband router 16 is additionally attached to an antenna 24. In alternate embodiments, each of the elements described herein may be stably connected to a frame 13, or other structural members attached to the frame 13, such as a plurality of panels 15. As shown, the frame 13 is made of a suitable rigid material, such as metal, and primarily serves to hold the components of the surveillance unit 25 in proper position. A digital video recorder 14 having H264 compression technology, also called H.264.10, is commercially available from Bruester Alexander, 1401 North Bluff Road, Collinsville, Ill. 62234 as a product named Max Mobile Hybrid Digital Video Server. An example of the camera 12 includes a PTZ camera available from PELLCO, 320 West 18$^{th}$ Street, Edmond, Okla. 73013 as PELLCO SD 5318-PG-E0. The other elements within the invention are also commonly commercially available including the broadband router 16, which is available from Afar Communications, Inc., 81 David Love Place, Santa Barbara, Calif. 93117 as Model # AR24027. In still other embodiments of the present invention, a broadband router 16 may include a router from Netgear, Inc., 4500 Great American Parkway, Santa Clara, Calif. 95054. The UPS system 18 is also commercially available from American Power Conversion, 132 Fairgrounds Road, West Kingston, R.I. 02892, as Model #BE3504. The antenna 24 and microphone/speaker 22 are widely commercially available. Also widely commercially available is the cooling system 26. With reference to the backlit artwork 20, backlit illumination side panels for the housing 10 are available from Luminous Film, 7100 West Park Road Shreveport, La. 71129 as Model # 025X12BGC. As previously described herein the illumination panels may be custom designed with various artwork which is available at the preference of the user. The housing 10 is a box enclosure with a custom mounting unit which is available from STI, Inc., 1877 Vanderhorn Drive, Memphis, Tenn. 38134. Additionally, with reference to the embodiments in which the housing 10 consists of a bullet resistant material, such bullet resistant polycarbonate or kevlar type NIJ level III A is commercially available from GE Specialty Film and Sheet, 7663 Industrial Blvd., Allentown, Pa. 18106.

Figure 2:
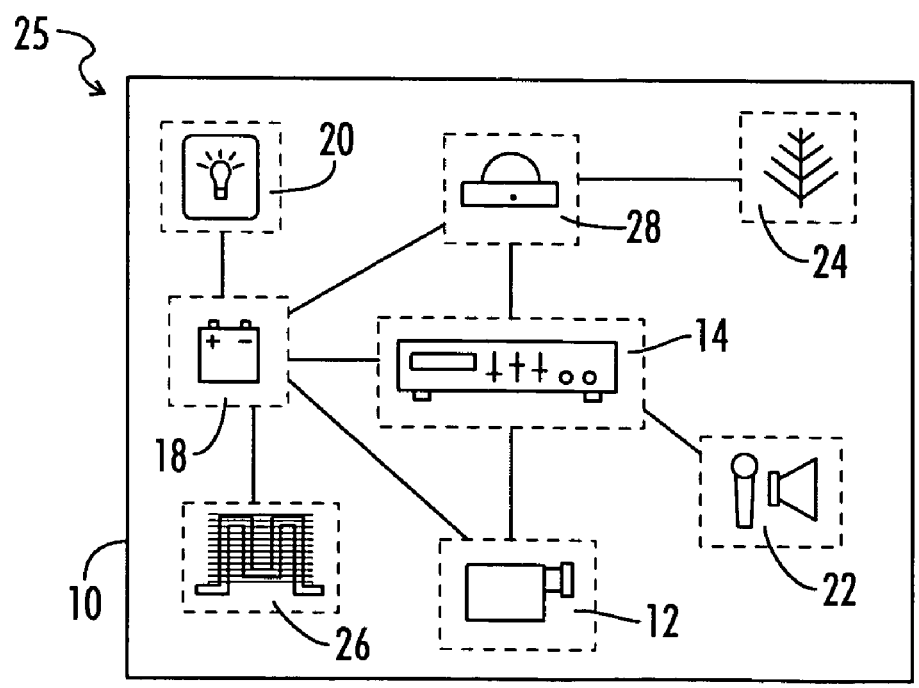
FIG. 2 shows a second embodiment of the surveillance unit having the ability to connect to a global network.

Referring now to FIG. 2, there is shown a schematic diagram of a second embodiment of the present invention. The second embodiment uses a GSM network 28 rather than a broadband router 16. A GSM network is commercially available for example from Verizon, 700 Brookfield Parkway, Greenville, S.C. 29607 as a Verizon Peripheral Component Interconnect (PCI) Card.

Figure 3:
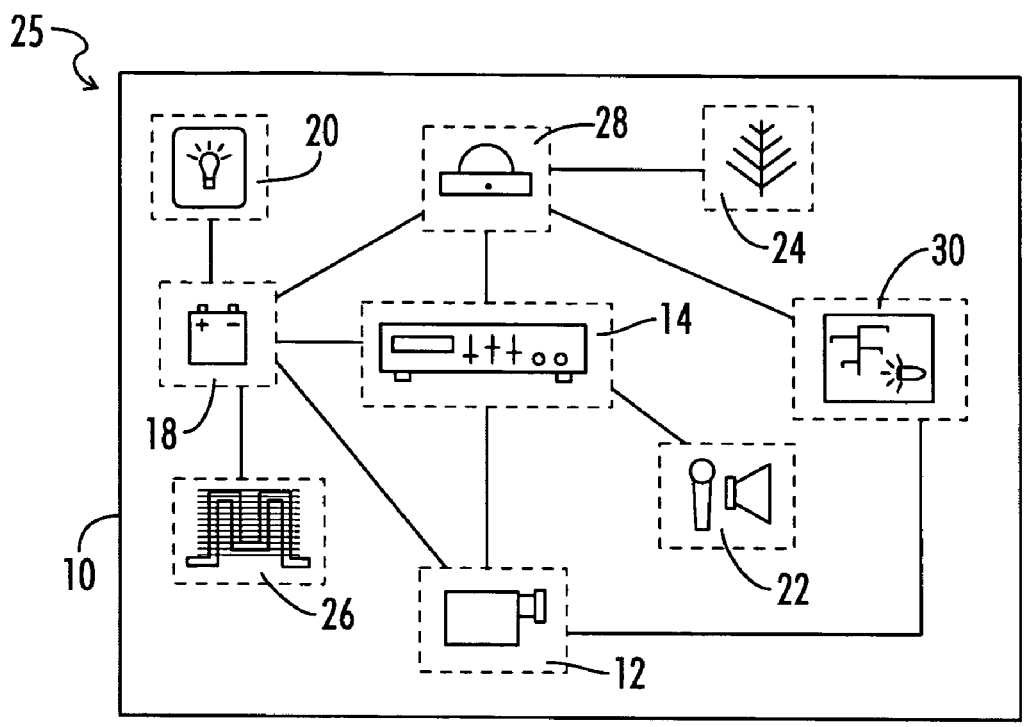
FIG. 3 shows a third embodiment of the surveillance unit having global network capacity and a microphone system for audio detection.

Referring now to FIG. 3, there is shown a schematic diagram of a third embodiment of the present invention. The third embodiment of the present invention includes a gunshot detection 30 system. The gunshot detection 30 system is used to orient the camera 12 in the direction of any activity which is detected, such as a gunshot. The gunshot detection 30 system is commercially available from Safety Dynamics, Inc., of 701 Harger Rd., Oak Brook, Ill. 60523 as the Sentry System. Again, the schematic diagram shows the gunshot detection 30 system operationally connected to the camera 12 and the GSM 28. Accordingly, when a gunshot is detected, the camera 12 rotates in the direction of the gunshot and the GSM 28 communicates with a second unit 27, for example a 911 center in order to quickly report the incident.

Figure 4:
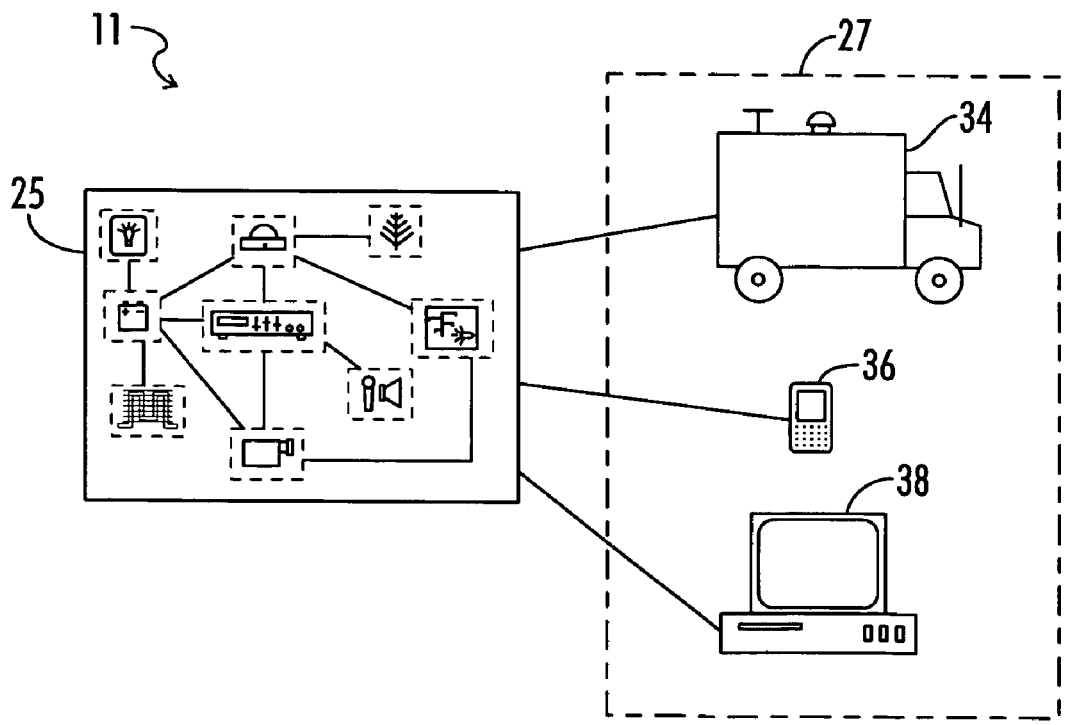
FIG. 4 shows a schematic diagram of an embodiment of a surveillance system.

Referring now to FIG. 4, there is shown a schematic diagram of the surveillance system 11 which includes the surveillance unit 25 and its ability to communicate with second units 27, such as PDAs 36, computers 38, etc., through the router 16, or GSM 28. Those of ordinary skill in the art are familiar with such communications. In certain embodiments of the surveillance system 11 the surveillance unit 25 communicates with a mobile command center 34, for example of the local law enforcement. In alternate embodiments the surveillance system 11 provides a surveillance unit 25 which communicates with a PDA 36 which may be in the possession of a law enforcement office, or other security personnel. In still other embodiments of the surveillance system 11, the surveillance unit 25 communicates with a laptop computer 38 of a law enforcement vehicle. As further disclosed herein, the second unit 27 may access information, such as recorded video, from the surveillance unit 25, or provide commands to the surveillance unit 25 to gather further information. Examples include redirecting or refocusing the camera 12, or the like. One of ordinary skill in the art is familiar with the well known communication, or information exchange, protocols which provide such communication between the router 16, or GSM 28 and the second units 27.

Figure 5:
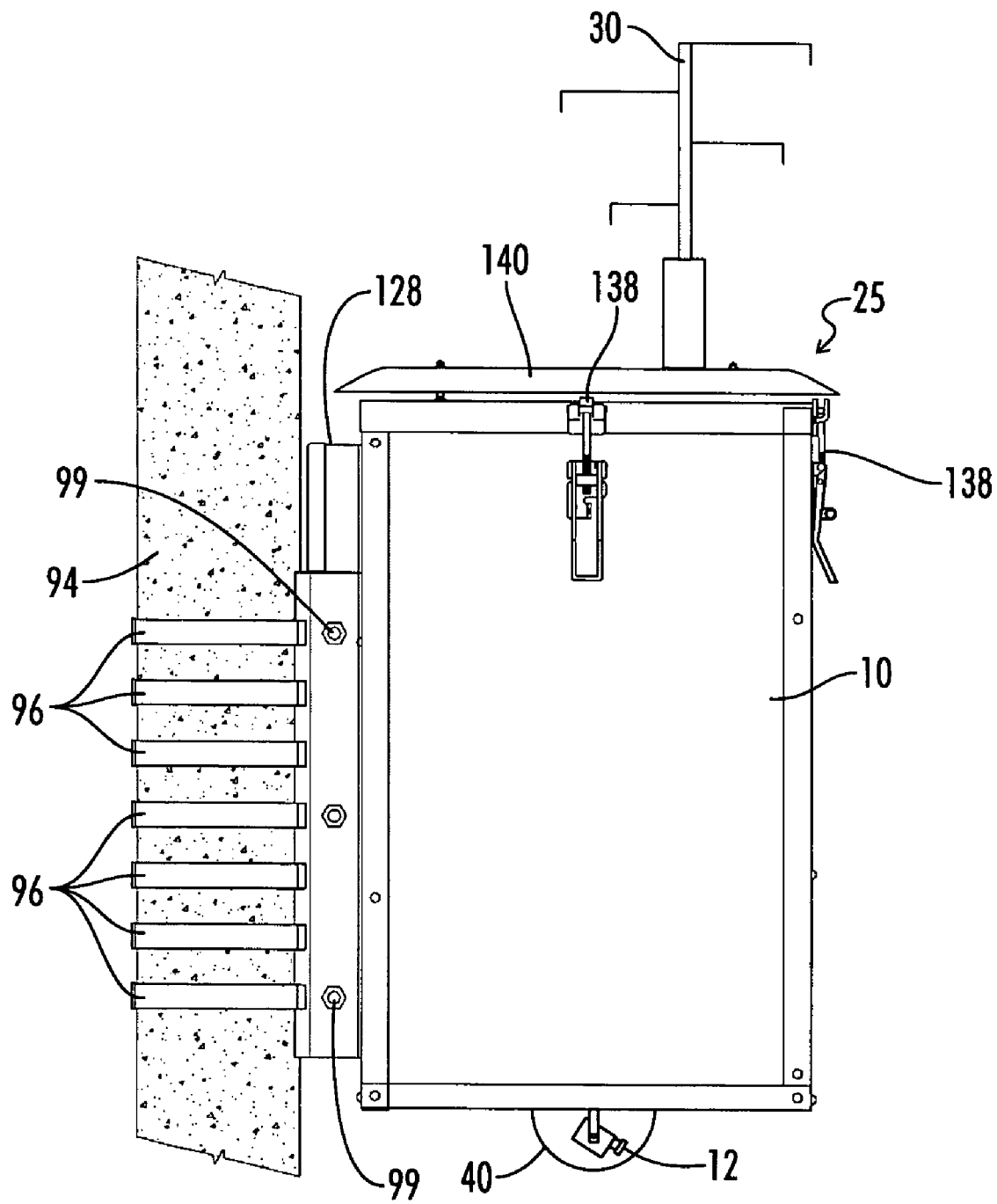
FIG. 5 is a side view of an embodiment of the present invention which shows the exterior of the surveillance unit.

Referring now to FIG. 5, there is shown an embodiment of the exterior of the surveillance unit 25. As previously described herein, the electronics and other components are contained within the unit 25. The camera 12 has a position within the protective bubble 40 protruding from the bottom of the surveillance unit 25. The latches 138 are used to hold the removable top 140 to the unit 25. The top 140 is removable for insertion of the components described in this document. In certain embodiments, the gunshot detection unit 30 may be attached to the top of the unit 25. Again the housing 10 may be constructed of a luminescent material in order to promote visualization in the dark. Examples of the illumination material backlight illumination side panels which is commercially available from Luminous Film 7100 West Park Road Shreveport, La. 71129. The surveillance unit 25 may be mounted on a pole 94, building (not shown), or the like, using a mounting bracket, as disclosed herein. The unit 25 may be typically elevated in order to promote good recording angles by the camera 12 as well as placing the unit 25 above and beyond the reach of the ordinary person. In certain embodiments, the surveillance unit 25 is housed in a state of the art enclosure, still called a housing 10, that may provide bullet resistant materials and weather protection for all of the internally located electronic devices. The present invention is designed for quick data downloads which may be received by a variety of second units 27.

Figure 6:
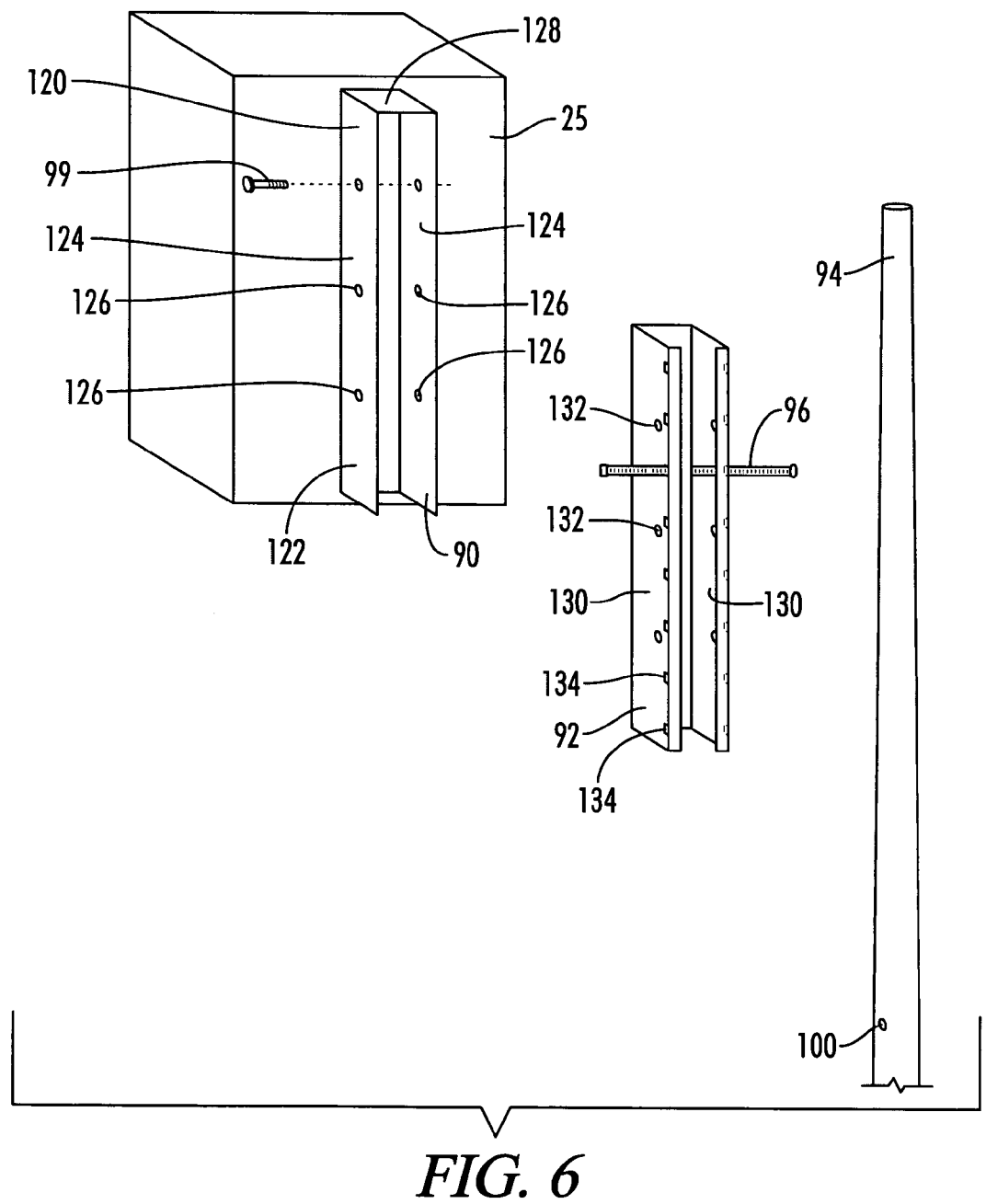
FIG. 6 shows the mounting bracket of the invention which may be used for attachment to a pole.

Referring now to FIG. 6, there is shown the bracket mounting system of the present invention. The bracket mounting system include a first mount 90 which attaches to the surveillance unit 25, a second mount 92 which attaches to a pole 94 by use of a metal band screw clamp 96. The metal band screw clamp 96 wraps around a pole 94 in order to attach. The second mount 92 is received by the first mount 90 and the two are attached by use one or more bolts 99. More specifically, the first mount 90 has the shape of a channel, the channel having a first end 120, a second end 122, and opposite sides 124. The opposite sides 124 of the first mount 90 have a plurality of openings 126 which are used for attachment to the second mount 92. The first mount 90 has a top 128, also called a cap, on the first end 120 which allows the surveillance unit 25 to rest upon the second mount 92 while bolts 99 are inserted and tightened. This prevents the need to hold the surveillance unit 25, which may weigh up to several hundred pounds, in the air during installation.

The second mount 92 has a rectangular shape having opposite sides 130 which have a plurality of openings 132 corresponding to the openings 126 of the first mount 90. The opposite sides 130 of the second mount 92 also have a plurality of second openings 134 located near the side 136 of the second mount 92 which is closest to the pole 94, or building to which the surveillance unit 25 is being attached. In certain embodiments, there may be 5 of these openings 134 for attachment of the second mount 92 to the pole 94, or building. As a first step, the second mount 92 is attached to the structure, for example a pole 94, by use of a plurality of metal screw clamps 96, bands, or the like which are fed through the second openings 134 and around the pole 94. Then, the first mount 90, which is attached to the surveillance unit 25, receives the second mount 92 and is held in place temporarily. Bolts 99, or other fasteners, are then fed through the openings 126 and openings 132, which line up, and tightened into position. The manner of attachment of the first mount 90 to the unit 25 could be any of those commonly known in the art, for example, welding. The first mount 90, second mount 92 may be constructed by metal, or other rigid material known in the industry which would be capable of serving the function disclosed herein. It is noteworthy that an empty surveillance unit 25 weighs approximately 50 pounds. Accordingly, surveillance units 25 containing a portion of the electrical equipment disclosed herein, or all of it, will have an even greater weight. The bracket system disclosed herein provides a universal mounting system for building or pole applications which has a unique design for easy installation and removal. In certain embodiments, a panic button 100 may be installed on the pole 94 at a height which is approximately from three feet to six feet off the ground. The function of the panic button 100 is to allow an individual to have a button to push in the event that they feel threatened or uncomfortable so that the surveillance unit 25 may respond by directing the camera 12 in the direction of the panic button 100 in order to record the audio and video of that specific setting. Security call buttons are well known in the industry and may be commercially available from STI, Inc., 1877 Vanderhorn Drive, Memphis Tenn., 38134, Model # MSCB-1. In certain embodiments, depressing the panic button 100 may result in communication with a 911 center or other security personnel.

Figure 7:
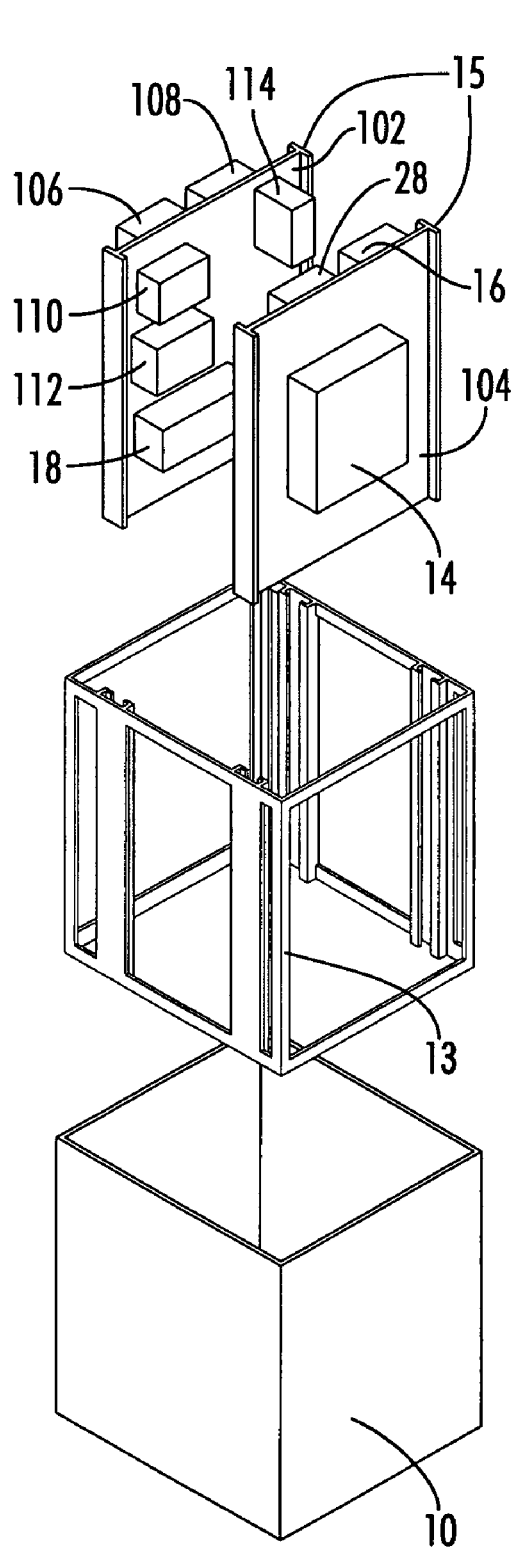
FIG. 7 shows a perspective view of an embodiment of the surveillance unit having two panels upon which components are mounted. The panels slide into the frame, which in turn slides into the housing.
Figure 8:
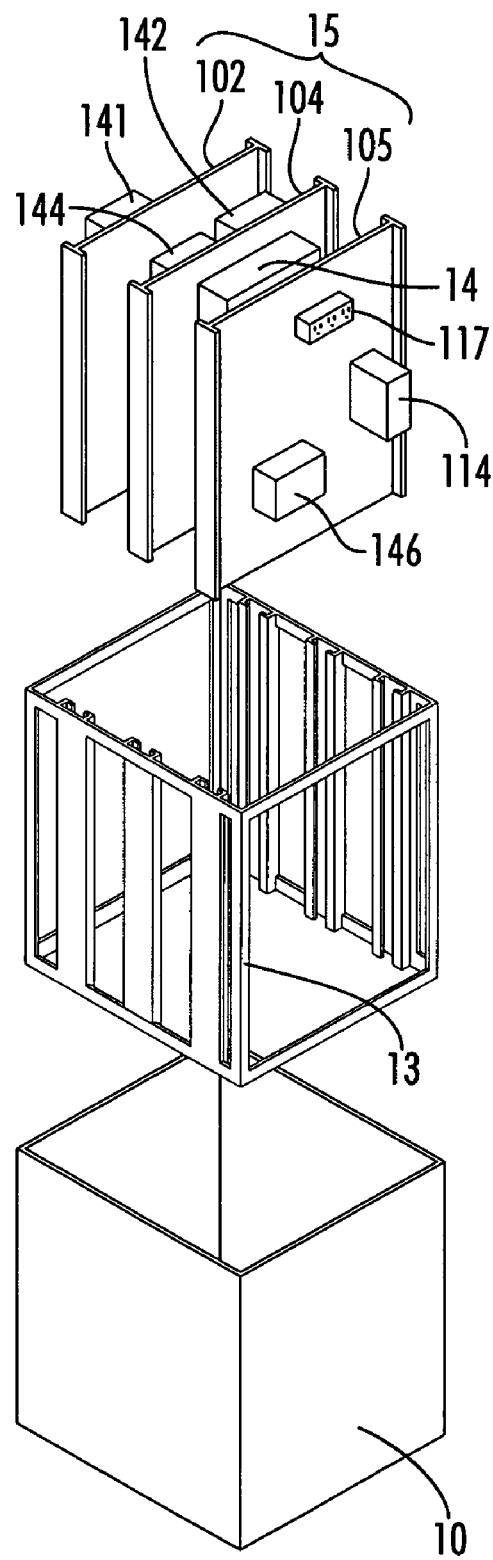
FIG. 8 shows a perspective view of an embodiment of the surveillance unit having three panels upon which components are mounted. The panels slide into the frame, and the frame slides into the housing.
Figure 9:
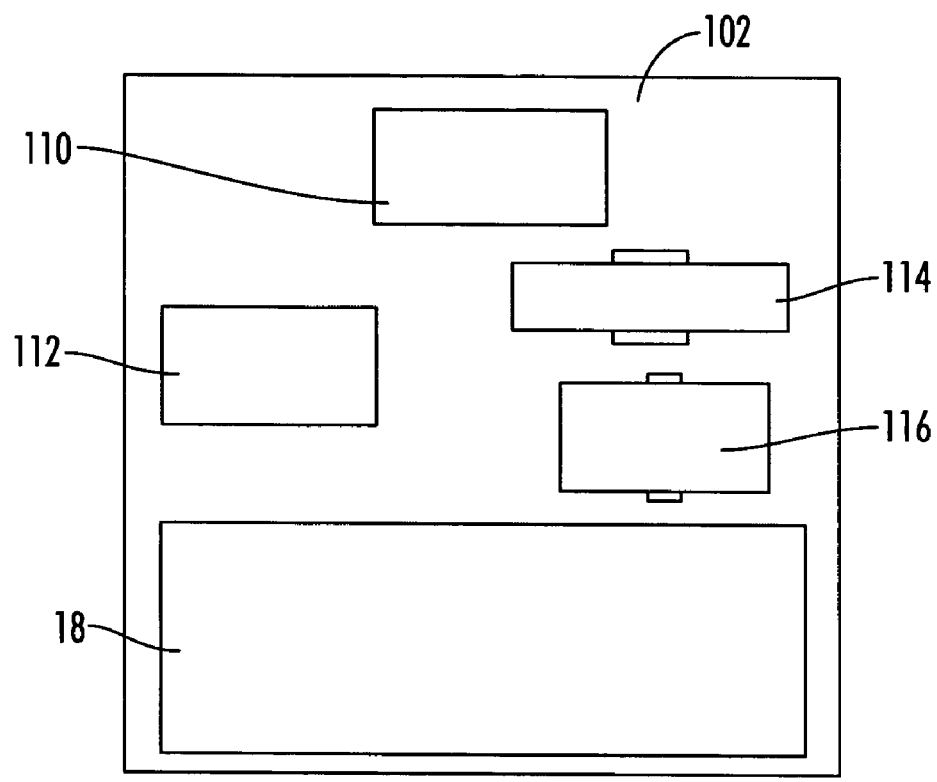
FIG. 9 is a drawing of the first side of the first panel of an embodiment of the surveillance unit, shown in FIG. 7.
Figure 10:
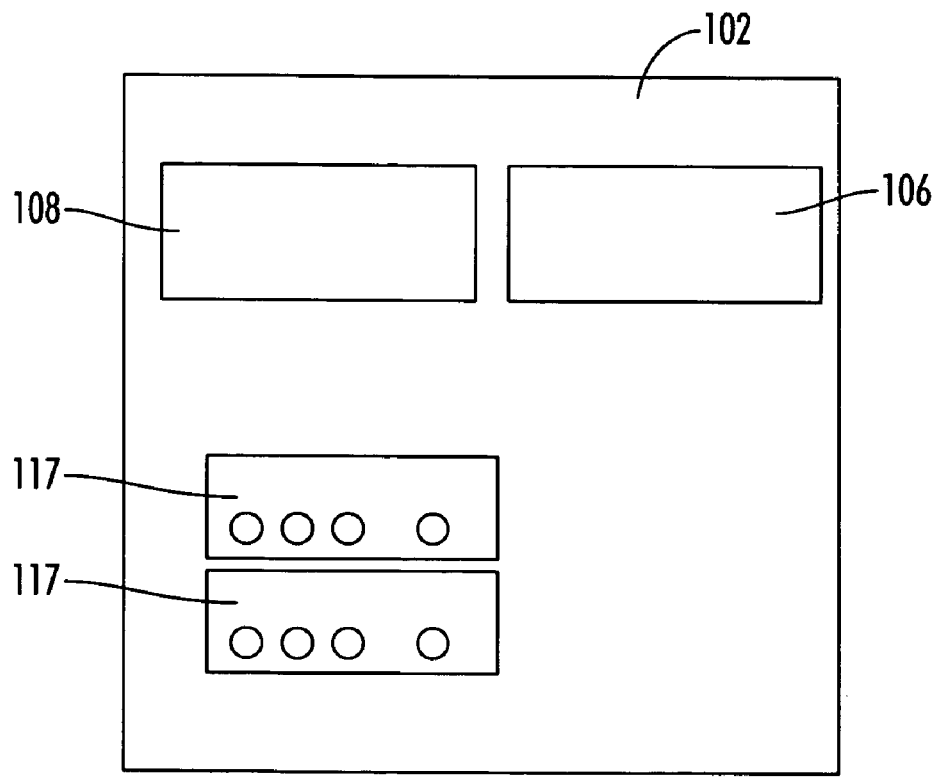
FIG. 10 is a drawing of the second side of the first panel of an embodiment of the surveillance unit, shown in FIG. 7.
Figure 11:
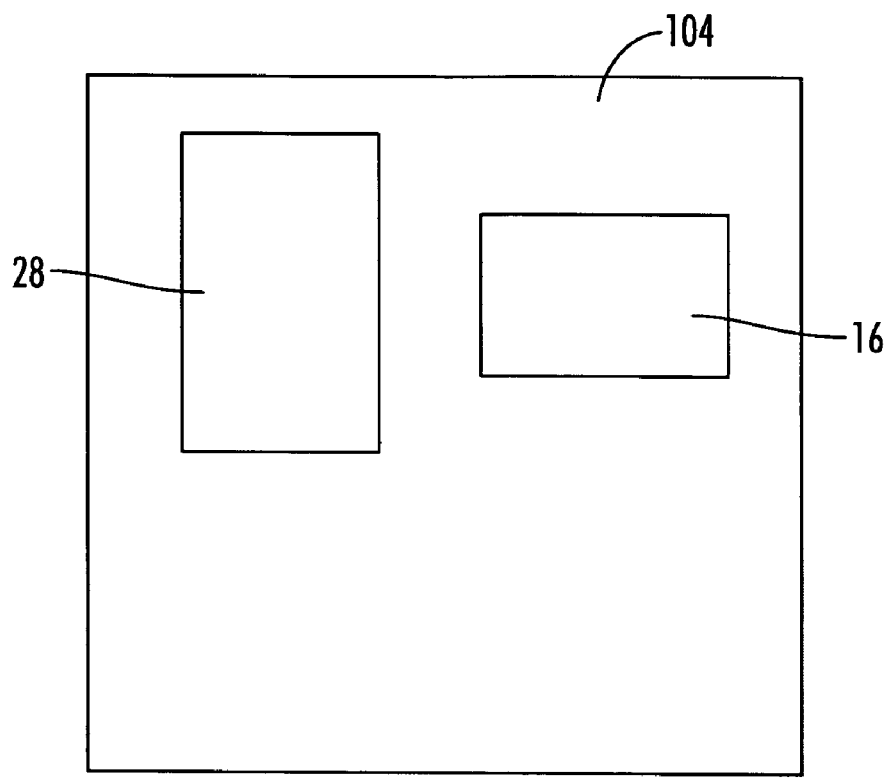
FIG. 11 is a drawing of the first side of the second panel of an embodiment of the surveillance unit, shown in FIG. 7.
Figure 12:
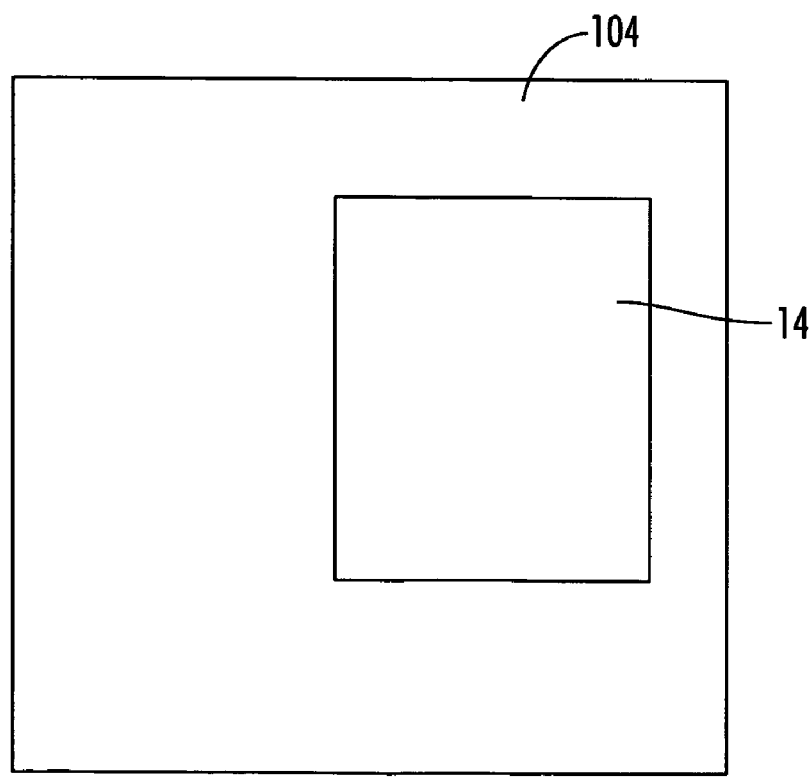
FIG. 12 is a drawing of the second side of the second panel of an embodiment of the surveillance unit, shown in FIG. 7.

Referring now to FIGS. 7 and 8, there are shown exploded perspective views of embodiments of the present invention. FIG. 7 is an embodiment of the invention having the components mounted upon two panels, 102 and 104, the components being operationally connected as described herein and known to those of skill in the art. Shown in FIG. 8 is an embodiment with three panels, 102, 104, and 105, respectively, the components being operationally connected as described herein and known to those of skill in the art. In certain embodiments, the frame 13 has vertical guides used to assist in the placement of the plurality of panels 15. In other embodiments, the frame 13 does not have vertical guides but has only notches in the frame 13 which receive the plurality of panels 15. In certain embodiments, the housing 10 has a plurality of spacers 9 upon which the frame 13 rests upon placement in the housing 10. In other embodiments, the plurality of spacers 9 may be attached to the bottom side of the frame 13 for proper positioning once placed in the housing 10. The plurality of spacers 9 may be constructed of any rigid material suitable for the described function. Shown in FIGS. 7 and 8 is the attachment of the components described herein to plurality of panels 15. Referring to FIG. 7, attached to the first panel 102 is a 12 volt power supply 106, which provides a power supply 108 for the luminescent panels disclosed herein; the UPS 18, which is the power supply 110 for the GSM 28; a general power supply 112 for the entire unit 25, and a transformer 114 for the camera 12. Schematic drawings of the attachments to the first panel 102 are shown in FIGS. 9 and 10, which also show the power terminal 116, and outlets 117 from the UPS 18. Still referring to FIG. 7, but now referring to the second panel 104 to which various components are attached, see attached thereto are the GSM 28, broadband router 16 and the DVR 14. Schematic drawings of the attachments to the first side and second side of the second panel 104 are further shown in FIGS. 11 and 12. FIGS. 7-12 do not show the power transmission connections or the data transmission connections since that information is shown in FIGS. 1-4. One of ordinary skill in the art is familiar with operationally connecting the electronic devices disclosed herein. FIGS. 7 and 8 do not show the camera 12 which is attached to the bottom side of the housing 10. The camera 12 is best seen in FIG. 5.

Referring now to FIG. 8, there is shown an embodiment having three panels. In the embodiment shown, the board 141 for the gunshot detection unit 30 is mounted on the first panel 102. The DVR 14, data switch 142, and wireless booster 144 are mounted on the second panel 104. The outlets 117, transformer 114, and power supplies 146 are mounted on the third panel 105. Again, each of the components listed herein is operationally connected so that the surveillance unit 25 operates and functions as described herein.

The surveillance unit 25 disclosed herein is used for accurate two way remote recording of audio and single directional video. The camera 12 has full 360 degree rotation. In certain embodiments, the camera 12 may be mounted on a rotatable mount. The unit 25 is designed for outdoor use and, in certain embodiments, has dimensions of width 18.5 inches, height 30.5 inches and depth of 18.25 inches. The unit 25 is an environmentally controlled enclosure and is designed to house all necessary electronics in any type of weather. The unit 25 works on copper, fiber or wireless networks. The camera 12 is equipped for day or night operation and may use IR illumination for night viewing or recordation.

Figure 13:
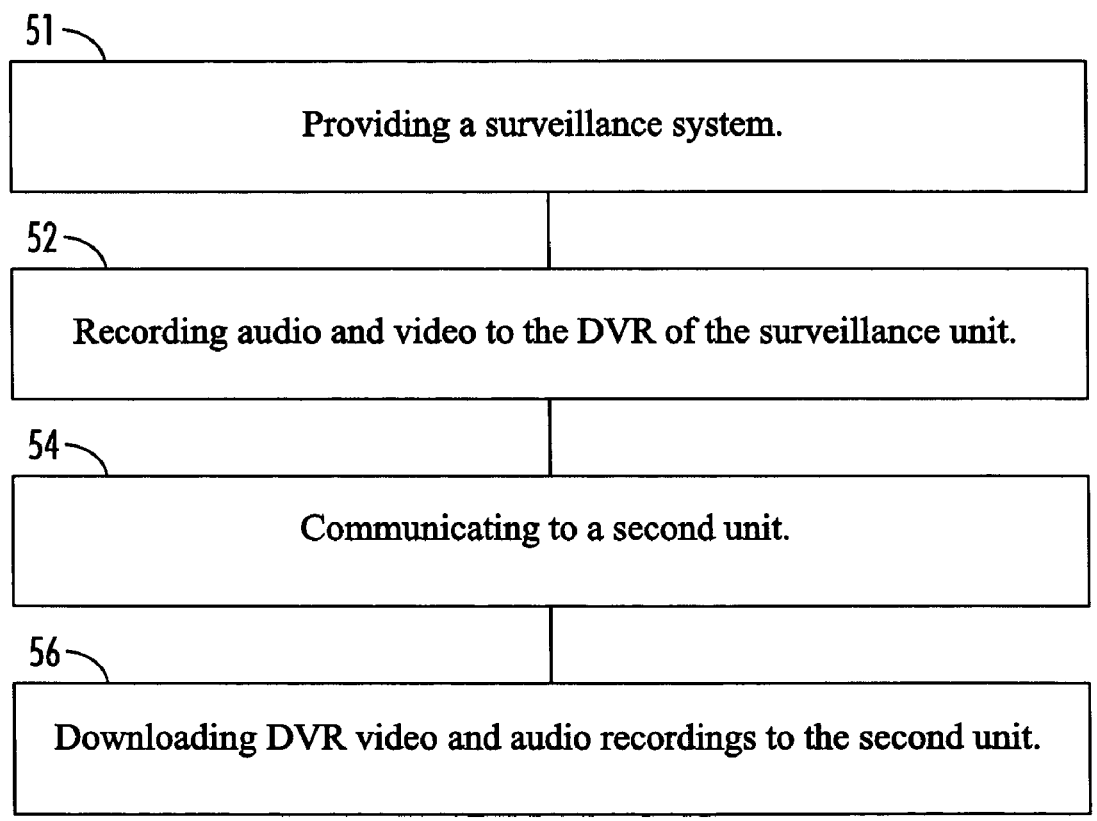
FIG. 13 shows a schematic diagram of a method of conducting surveillance at a playground for children.

Referring now to FIG. 13, there is shown a schematic diagram of the method of conducting surveillance. The method includes providing 51 a surveillance system 40, recording 52 audio and video to the DVR 14 of the surveillance unit 25, communicating 54 to a 911 center 39 or other second unit 27, downloading 56 the recordations of the DVR 14 to the second unit 27, so that the recipient of the recordations from the DVR 14 may further consider and analyze such recordations.

Figure 14:
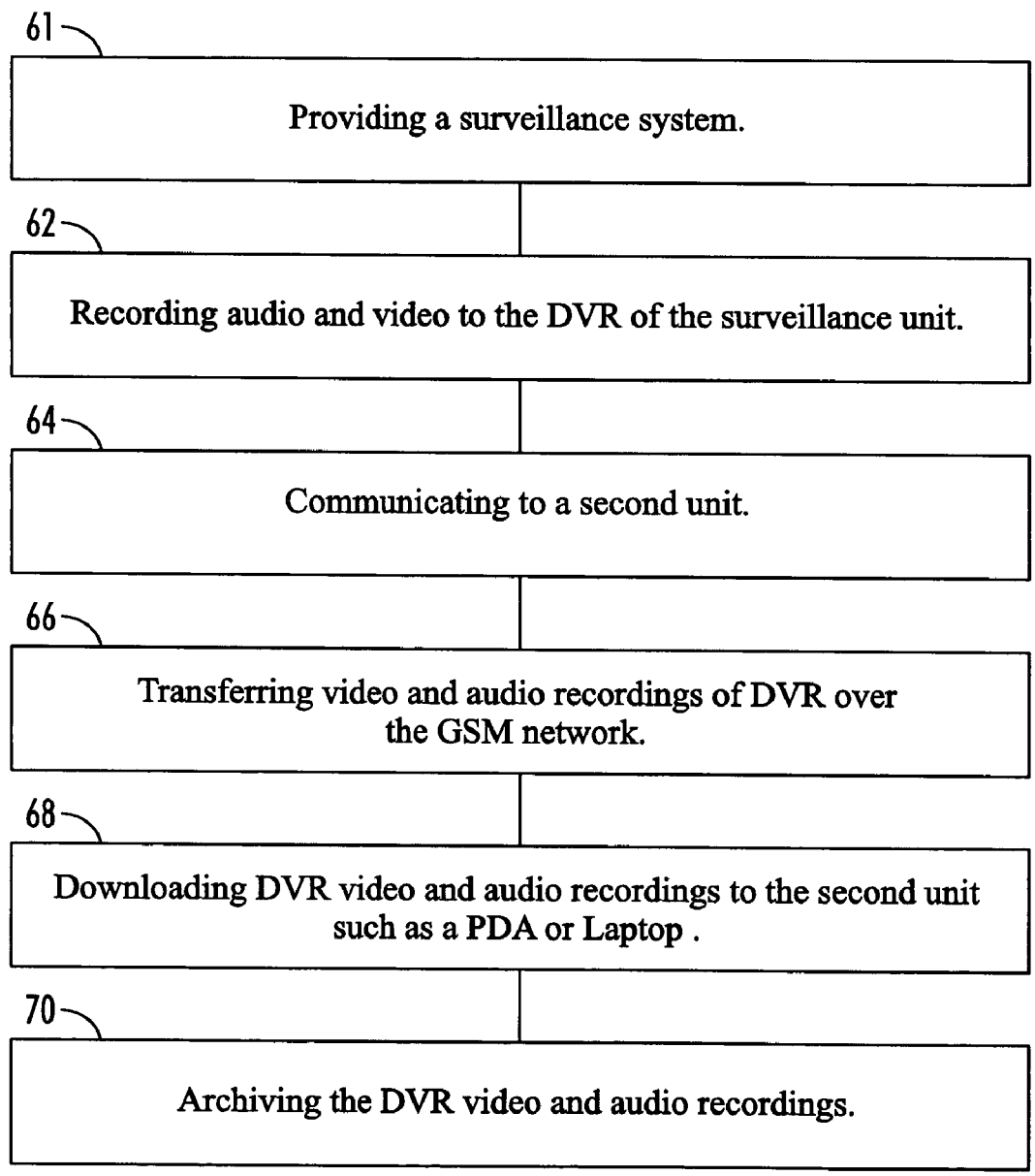
FIG. 14 shows a schematic diagram of a method of conducting surveillance at a mall.

Referring now to FIG. 14, there is shown a schematic diagram of a second method of conducting surveillance. The method shown includes providing 61 a surveillance system 11 having a surveillance unit 25 and a plurality of second units 27, recording 62 the audio and video captured by the camera 12 and the microphone 22, communicating 64 with a second unit 27, transferring 66 video and audio recordations of the DVR 14, also called data, by use of a GSM 28 network, downloading 68 the recordation of the DVR 14 to a second unit 27 such as a PDA or laptop and used by a law enforcement officer, and archiving 70 the data from the DVR 14 received by the second unit 27.

Figure 15:
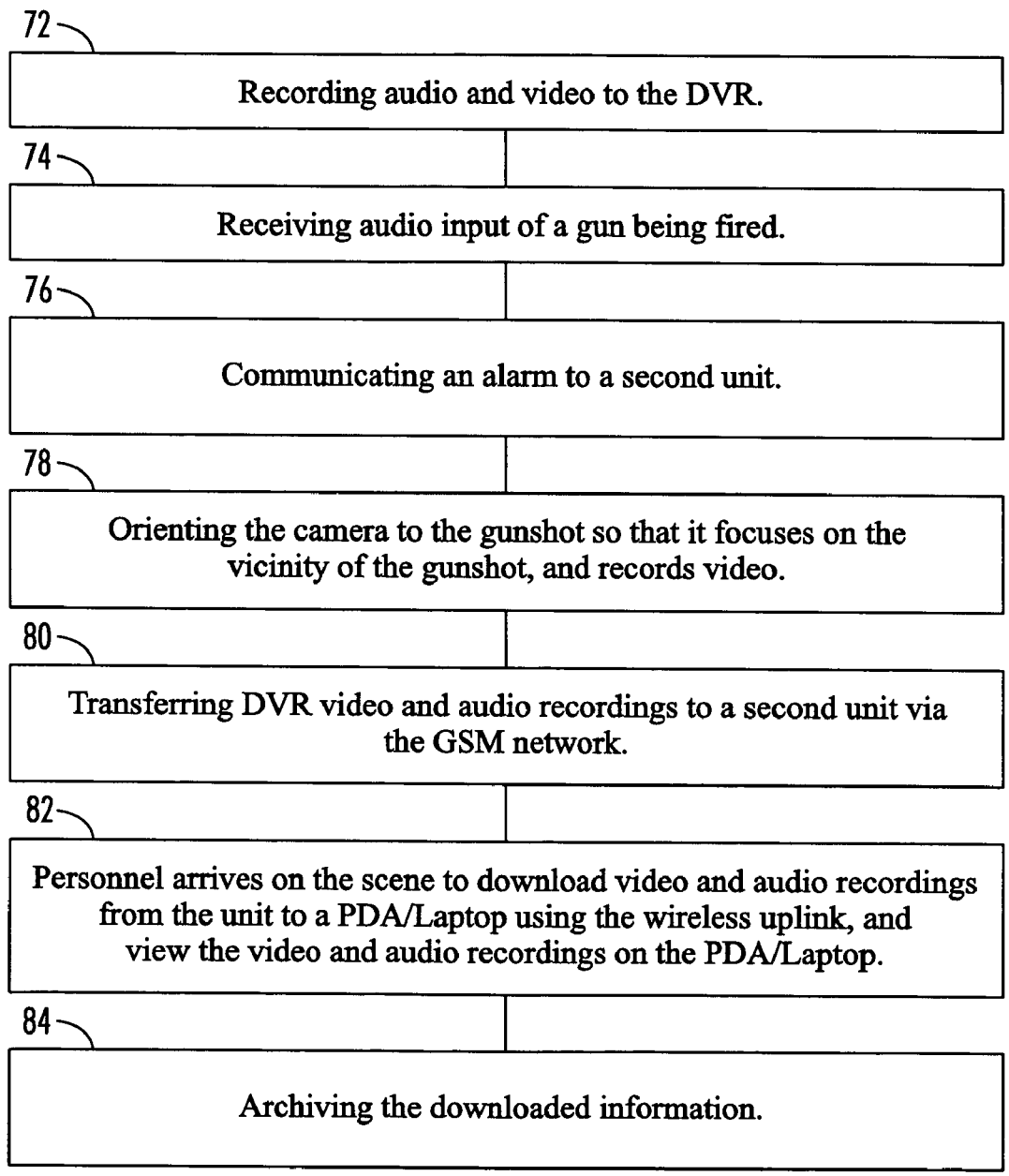
FIG. 15 shows a schematic diagram of a method of conducting surveillance upon detection of a gun being fired.

Referring now to FIG. 15, there is shown a schematic diagram of another method of conducting surveillance. This embodiment of the method includes recording 72 audio and video to the DVR 14, receiving 74 audio input representative of gunshot fired in the area of the surveillance unit 25, communicating 76 an alarm to a second unit 27 such as a 911 center 39, orienting 78 the camera 12 to the vicinity of the gunshot so that audio and video are recorded on the DVR 14, transferring 80 audio and video detected by the camera 12 to a second unit 27 via the GSM 28 network, downloading recordations from the DVR 14 to a second unit 27 such as a PDA 36 or a laptop 38, and archiving 84 the data recorded by the DVR 14.

This patent application expressly incorporates by reference all patents, references, and publications disclosed herein.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A surveillance system, comprising:
   a housing;
   a frame removeably engaging the housing;
   a plurality of panels removeably engaging the frame;
   a recording device attached to one of the plurality of panels, wherein the recording device has H.264.10 compression technology;
   a camera operationally connected to the recording device, wherein the camera has a microphone and speaker;
   a GSM network operationally connected to the recording device;
   a uninterrupted power source operationally connected to the recording device; and
   a mounting bracket attached to the housing, wherein the mounting bracket has a first mount and a second mount removeably engaging the first mount, wherein the first mount is a channel for receiving the second mount, the channel having a first end, a second end, and opposite sides, the opposite sides defining a plurality of openings, the first end having a top.

2. The system of claim 1, further comprising a second unit communicationally connected with the surveillance unit.

3. The system of claim 1, further comprising a gunshot detection unit operationally connected to the camera so that the camera rotates and focuses in the direction from which a gunshot is detected.

4. The system of claim 3, wherein the recording device is a digital video recorder.

5. The system of claim 4, wherein the housing is bulletproof.

6. The system of claim 5, wherein the housing is backlit.

7. A surveillance system, comprising:
   a housing;
   a frame removeably engaging the housing;
   a plurality of panels removeably engaging the frame;
   a first mount attached to the housing;
   a second mount removeably engaging the first mount, wherein the first mount is a channel for receiving the second mount, the channel having a first end, a second end, and opposite sides, the opposite sides defining a plurality of openings, the first end having a top.

8. The system of claim 7, wherein the second mount is an arm, having opposite sides defining a plurality of openings, the openings corresponding to the openings of the first mount.

9. The system of claim 8, wherein the opposite sides of the second mount define a plurality of second openings adjacent to a side opposite of the side proximate to the housing so that the plurality of second openings receive fasteners.

10. The system of claim 9, wherein the plurality of second openings of the second mount is at least 5 openings.

11. The system of claim 10, wherein the second mount has a length of at least 12 inches.

12. The system of claim 11, further comprising a plurality of spacers attached to the housing so that a ventilation gap results when the frame sits upon the plurality of spacers.

13. A surveillance system, comprising:
   a frame, wherein the frame is generally rectangular in shape;
   at least one panel removeably engaging the frame;
   an uninterrupted power source attached to the panel;
   a cooling system operationally connected to the uninterrupted power source;
   a digital video recorder operationally connected to the uninterrupted power source;
   a video camera operationally connected to the digital video recorder;
   a microphone and speaker operationally connected to the digital video recorder;
   a GSM network operationally connected to the digital video recorder;
   a gunshot detection system operationally connected to the digital video recorder;
   a second unit operationally connected to the GSM network so that the camera and digital video recorder are controlled remotely by the second unit;
   a housing attached to the frame, wherein the housing is bullet proof, wherein at least a portion of the housing is backlit;
   a first mount attached to the housing, wherein the first mount is a channel for receiving the second mount, the channel having a first end, a second end, and opposite sides, the opposite sides defining a plurality of openings, the first end being enclosed; and
   a second mount removeably engaging the first mount, wherein the second mount is an arm having opposite sides defining a plurality of openings, the openings corresponding to the openings of the first mount, wherein the opposite sides of the second mount define a plurality of second openings adjacent to a side opposite of the side proximate to the housing so that the plurality of second openings receive fasteners for attaching the second mount to a pole.

14. The system of claim 13, wherein the second unit is a personal data assistant.

15. The system of claim 13, wherein the second unit is a laptop computer.

16. The system of claim 13, wherein the second unit is a mobile command center.

* * * * *